(12) United States Patent
Weidlich

(10) Patent No.: US 6,538,774 B2
(45) Date of Patent: Mar. 25, 2003

(54) METHOD OF MEASURING CELLS AND DEVICE FOR MEASURING THE CELLS

(75) Inventor: Ernst-Rudolf Gottfried Weidlich, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/001,172

(22) Filed: Nov. 2, 2001

(65) Prior Publication Data

US 2002/0060813 A1 May 23, 2002

Related U.S. Application Data

(63) Continuation of application No. PCT/DE00/01132, filed on Apr. 12, 2000.

(30) Foreign Application Priority Data

May 3, 1999 (DE) .......................................... 199 20 206

(51) Int. Cl.[7] ................................................. B41C 1/04
(52) U.S. Cl. ...................... 358/3.29; 700/195; 358/406; 356/635
(58) Field of Search ................................. 358/3.29, 3.3, 358/3.31, 3.32, 406; 700/173, 174, 175, 177, 195; 455/67.1; 356/625, 635

(56) References Cited

U.S. PATENT DOCUMENTS

| | | | |
|---|---|---|---|
| 3,931,570 A | 1/1976 | George et al. ................. 216/84 |
| 5,293,426 A | 3/1994 | Wouch et al. .............. 358/3.29 |
| 5,422,958 A * | 6/1995 | Wouch et al. .............. 358/3.29 |
| 5,671,063 A * | 9/1997 | Auberry et al. ............ 358/3.29 |
| 5,828,464 A * | 10/1998 | Yoshida et al. ............ 358/3.29 |
| 6,348,979 B1 * | 2/2002 | Flannery et al. ............ 358/406 |

FOREIGN PATENT DOCUMENTS

DE 197 33 442 A1 12/1998 ............. B41C/1/04

OTHER PUBLICATIONS

"British Low Pressure Printed Form Manufacturer for Packaging Printing with Helio–Klischograph K 201" Klischograph 83/84, pp. 30–31.

* cited by examiner

*Primary Examiner*—Scott Rogers
(74) *Attorney, Agent, or Firm*—Laurence A. Greenberg; Werner H. Stemer; Ralph E. Locher

(57) ABSTRACT

A method for determining dimensions of an engraved cell formed by an electronic engraving machine, is described. During a test engraving period, test cells are engraved with desired dimensions defining predefined desired tonal values. An engraving element controlled by an engraving control signal is used for engraving a sequence of cells into a rotating printing cylinder resulting in engraved cells. Actual dimensions of the engraved cells represent actual tonal values. A measuring apparatus constructed as a mobile cell measuring instrument is placed on the printing cylinder to be measured. The actual dimensions of the engraved cells are measured and the actual dimensions are compared with the desired dimensions to obtain setting values for calibrating the engraving control signal such that the actual tonal values correspond to the desired tonal values. The actual dimensions of the engraved cells are transmitted wirelessly to a measured value receiver for further processing.

24 Claims, 2 Drawing Sheets

METHOD OF MEASURING CELLS AND DEVICE FOR MEASURING THE CELLS

CROSS-REFERENCE TO RELATED APPLICATION

This application is a continuation of copending International Application No. PCT/DE00/01132, filed Apr. 12, 2000, which designated the United States.

BACKGROUND OF THE INVENTION

1. Field of the Invention

The invention relates to the field of electronic reproduction technology and relates to a method and an apparatus for determining the dimensions of engraved sample cells in an electric engraving machine for engraving printing cylinders for gravure printing, and also such an engraving machine.

In an electronic engraving machine, an engraving element with an engraving gouge as a cutting tool moves in an axial direction along a rotating printing cylinder. The engraving gouge, controlled by an engraving control signal, cuts a sequence of cells disposed in an engraving pattern into an outer surface of the printing cylinder. An engraving control signal is formed by superimposing image signal values, that represent engraved tonal values between "light" and "depth", with a periodic scanning signal. While the scanning signal has the effect of a vibrating reciprocating movement of the engraving gouge in order to produce the engraved pattern, the image signal values determine the geometric dimensions of the cells engraved into the outer surface of the printing cylinder.

Before the actual engraving, during a so-called sample or test engraving, sample cells for predefined tonal values are engraved on the printing cylinder. After the sample cut, the actual geometric dimensions of the engraved sample cells are measured by a cell measuring apparatus and are compared with predefined desired geometric dimensions of the cells. From the value comparison, setting values are obtained with which the engraving control signal is then calibrated in such a way that the cells actually produced during the subsequent engraving correspond to the cells required for correct tonal value reproduction.

U.S. Pat. No. 5,293,426 discloses a method and an apparatus in the form of a measuring microscope for determining the dimensions of engraved sample cells in an electric engraving machine for engraving printing cylinders, and also such an engraving machine.

U.S. Pat. No. 3,931,570 describes a portable measuring apparatus for measuring the volume of engraved cells.

The cell measuring apparatus often used is a video camera. In this case, the actual geometric dimensions of the engraved sample cells are measured electronically in the video image recorded by the video camera.

In order to engrave printing cylinders for magazine printing, in practice a plurality of engraving machines are used, on which sample engravings have to be carried out. It then proves to be expedient, in order to measure the sample cells engraved with the individual engraving machines, to use only a single cell measuring apparatus, in order not to have to take account of tolerances which inevitably occur when a plurality of cell measuring apparatuses are used.

SUMMARY OF THE INVENTION

It is accordingly an object of the invention to provide a method of measuring cells and a device for measuring the cells that overcome the above-mentioned disadvantages of the prior art methods and devices of this general type, in which simple and accurate measurement of the engraved sample cells is made possible, in particular when a large number of engraving machines are used.

With the foregoing and other objects in view there is provided, in accordance with the invention, a method for determining dimensions of an engraved cell formed by an electronic engraving machine for engraving printing cylinders for gravure printing. During a test engraving period, test cells are engraved with desired dimensions defining predefined desired tonal values. An engraving element controlled by an engraving control signal is used for engraving a sequence of cells into a rotating printing cylinder resulting in engraved cells. Actual dimensions of the engraved cells represent actual tonal values. A measuring apparatus constructed as a mobile cell measuring instrument is provided and is placed on the printing cylinder to be measured. The actual dimensions of the engraved cells are measured using the mobile cell measuring instrument and the actual dimensions are compared with the desired dimensions determining the predefined desired tonal values, to obtain setting values for calibrating the engraving control signal such that the actual tonal values correspond to the desired tonal values. The actual dimensions of the engraved cells determined with the mobile cell measuring instrument are transmitted wirelessly to a measured value receiver for further processing.

In accordance with an added mode of the invention, there is the step of placing the measured value receiver in a fixed location.

In accordance with an additional mode of the invention, there is the step of carrying out a transmission of the actual dimensions only during a calibration period of the engraving control signal.

In accordance with another mode of the invention, there is the step of controlling functions of the mobile cell measuring instrument using a manually operated, mobile operating instrument.

In accordance with a further mode of the invention, there are the steps of generating control commands in the mobile operating instrument; and transmitting the control commands for controlling the functions of the mobile cell measuring instrument wirelessly from the mobile operating instrument to the mobile cell measuring instrument.

In accordance with another added mode of the invention, there is the step using the mobile operating instrument for controlling a positioning of the mobile cell measuring instrument with respect to the printing cylinder.

In accordance with another additional mode of the invention, there is the step of using the mobile operating instrument for controlling a focusing of the mobile cell measuring instrument onto the printing cylinder.

In accordance with a further added mode of the invention, there is the step of using the mobile operating instrument for controlling an illumination of the engraved cells.

In accordance with a concomitant mode of the invention, there is the step of operating the mobile cell measuring instrument and/or the mobile operating instrument with a rechargeable operating voltage source.

With the foregoing and other objects in view there is further provided, in accordance with the invention, an apparatus for determining dimensions of engraved cells formed by an engraving machine for engraving printing cylinders for gravure printing. The apparatus contains a measured value receiver, and a mobile cell measuring instrument to be placed on a printing cylinder to be measured to determine the dimensions of the engraved cells. The mobile cell measuring instrument has an integrated measured value transmitter for transmitting the dimensions of the engraved cells wirelessly to the measured value receiver for further processing.

In accordance with an added mode of the invention, the mobile cell measuring instrument includes a video camera to record a video image of the engraved cells; an illumination source for illuminating the engraved cells; and an image evaluation stage connected to the video camera for determining the dimensions of the engraved cells by electronic evaluation of the video image provided by the video camera. The image evaluation stage is also connected to the measured value transmitter for the wireless transmission of the dimensions of the engraved cells. In addition, the measured valued receiver is a fixed-location measured value receiver.

In accordance with an additional feature of the invention, the mobile cell measuring instrument has a rechargeable operating voltage source.

In accordance with another feature of the invention, the illumination source can be controlled in order to correct an illumination of the engraved cells.

In accordance with a further feature of the invention, the mobile cell measuring instrument has a controllable positioning device that is operatively connected to the video camera for positioning and/or focusing the video camera.

In accordance with another further feature of the invention, the mobile cell measuring instrument has a control stage connected between the positioning device and the illumination source to control the positioning device and/or the illumination source as a function of control commands received.

In accordance with another added feature of the invention, the mobile cell measuring instrument has a control command receiver connected to the control stage and receives the control commands wirelessly.

In accordance with another additional feature of the invention, the mobile cell measuring instrument has a control monitor for monitoring a measuring operation and is connected to the video camera.

In accordance with yet another feature of the invention, a manually operated, mobile operating instrument for generating the control commands is provided. The mobile operating instrument has a control command transmitter for transmitting wirelessly the control commands to the mobile cell measuring instrument.

In accordance with a further feature of the invention, the mobile operating instrument has a manually operated keyboard connected to the control command transmitter and a manually operated positioning device connected to the control command transmitter. The control commands are generated in the mobile operating instrument by use of the manually operated keyboard and by the manually operated positioning device.

In accordance with an added feature of the invention, the mobile operating instrument has a rechargeable operating voltage source.

In accordance with an additional feature of the invention, the mobile operating instrument is activated by an enable command received from the engraving machine.

With the foregoing and other objects in view there is additionally provided, in accordance with the invention, an engraving machine for engraving printing cylinders for gravure printing. The engraving machine contains a first drive for driving and mounting a printing cylinder so as to be capable of rotating the printing cylinder; an engraving element, acted on by an engraving control signal, for engraving cells into the printing cylinder; a second drive coupled to the engraving element for moving the engraving element along the printing cylinder; a signal conditioning stage for generating the engraving control signal and connected to the engraving element; and a sample engraving computer connected to the signal conditioning stage. The sample engraving computer formulates engraving control signal values for engraving the cells. A measuring apparatus is provided for measuring actual dimensions of the cells representing actual tonal values to be compared with desired dimensions representing predefined desired tonal values in order to obtain setting values for calibrating the engraving control signal. The measuring apparatus is a mobile cell measuring instrument disposed on the printing cylinder to be measured and has an integrated measured value transmitter. A fixed-location measured value receiver is connected to the sample engraving computer. The actual dimensions of the cells engraved determined by the mobile cell measuring instrument are transmitted wirelessly by the integrated measured value transmitter to the fixed-location measured value receiver for further processing.

In accordance with another feature of the invention, the mobile cell measuring instrument includes: a video camera to record a video image of the cells; a positioning device operatively connected to the video camera and receiving control commands for at least one of positioning and focusing the video camera; an illumination source, receiving and controlled by the control commands, for illuminating the cells; an image evaluation stage connected to the video camera for determining the actual dimensions of the cells by an electronic evaluation of the video image provided by the video camera; a rechargeable operating voltage source; and a measured value transmitter connected to the image evaluation stage. The measured value transmitter provides a wireless transmission of the actual dimensions of the cells to the fixed-location measured value receiver.

In accordance with a concomitant feature of the invention, a manually operated, mobile operating instrument for generating the control commands is provided. The mobile operating instrument has a control command transmitter for transmitting wirelessly the control commands from the mobile operating instrument to the mobile cell measuring instrument.

Other features which are considered as characteristic for the invention are set forth in the appended claims.

Although the invention is illustrated and described herein as embodied in a method of measuring cells and a device for measuring the cells, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
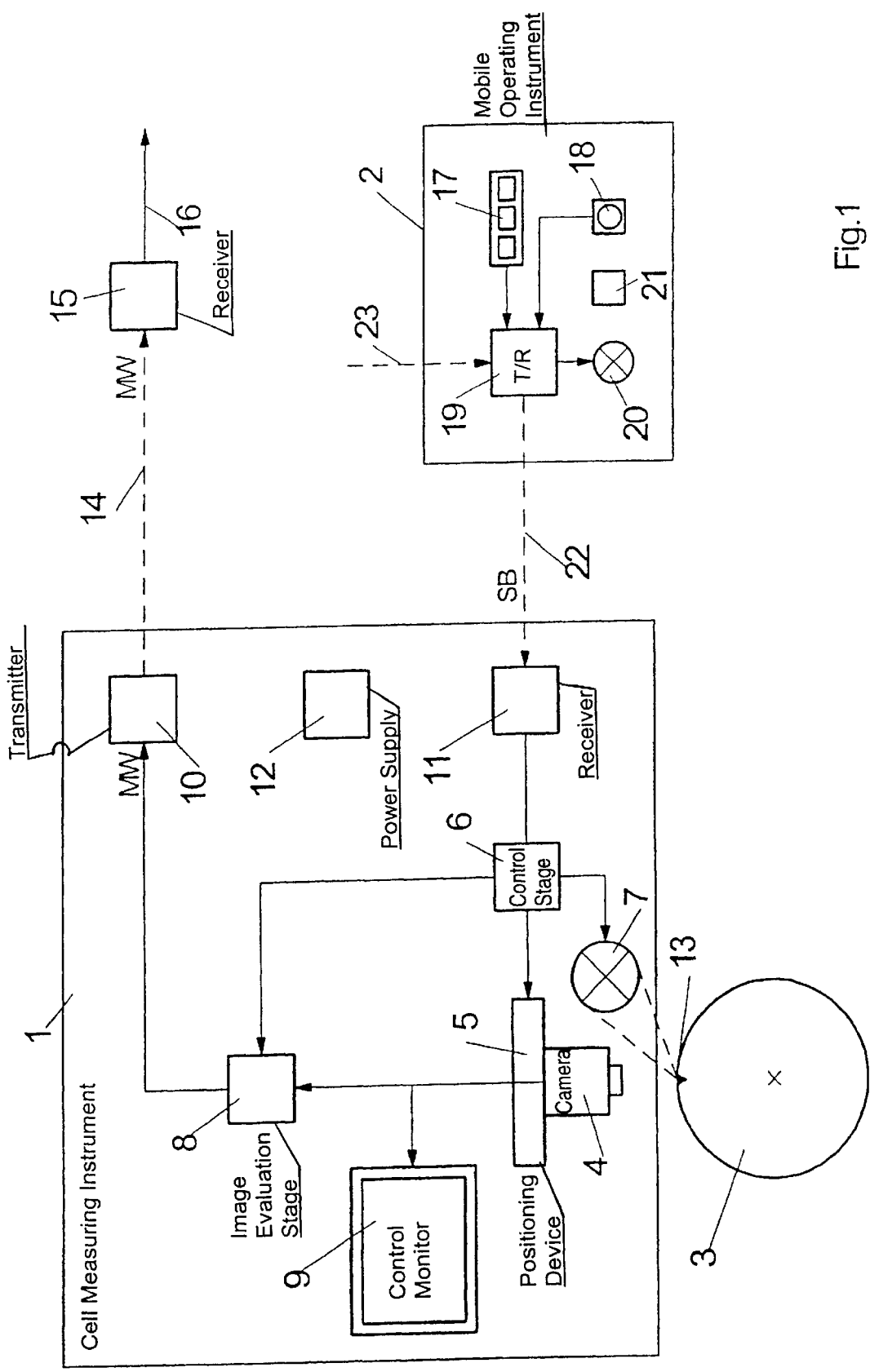
FIG. 1 is a block diagram of an apparatus for measuring engraved sample cells according to the invention.

Referring now to the figures of the drawing in detail and first, particularly, to FIG. 1 thereof, there is shown a block diagram of an apparatus for measuring engraved sample (test) cells, which contains a mobile cell measuring instrument 1 and a manually operated, mobile operating instrument 2.

In order to determine actual geometric dimensions of the sample cells engraved during a sample or test engraving, the mobile cell measuring instrument 1 is placed on an outer surface of a respectively engraved printing cylinder 3. The mobile cell measuring instrument 1 basically contains a video camera 4, a positioning device 5, a control stage 6, a positionable and adjustable illumination source 7, an image evaluation stage 8, a control monitor 9, a measured value transmitter 10, a control command receiver 11 and, to supply power to the components, an operating voltage source 12, which is constructed as a battery or as a rechargeable accumulator.

The video camera 4, constructed as a CCD camera, for example, is aimed at sample cells 13 which are engraved into the printing cylinder 3 and which are illuminated by the illumination source 7. The positioning device 5 is constructed, for example, as a displacement table, on which the video camera 4 is mounted. The displacement table of the positioning device 5 is operated by the control stage 6 and, in order to find an optimum image detail, permits two-dimensional displacement of the video camera 4 with respect to the outer surface of the printing cylinder 3. At the same time, the control stage 6 is able to carry out additional displacement of the video camera 4 or an objective of the video camera 4 in a direction of the printing cylinder 3, in order to achieve optimum focusing of the video camera 4 onto the engraved sample cells 3.

A video image of the engraved sample cells 13 recorded by the video camera 4 is fed to the image evaluation stage 8 and, for visual observation of the measuring process, is fed to the control monitor 9. The control monitor 9 is constructed, for example as a flat-screen monitor. In the image evaluation stage 8, an automatic electronic evaluation of the video image of the engraved sample cells 13 recorded by the video camera 4 is performed. From the evaluation, actual geometric dimensions, such as length and transverse diagonals, are determined and fed to the measured value transmitter 10 as measured values MW. The automatic electronic evaluation of the video image in the image evaluation stage 8 is carried out, for example, in accordance with International Patent Disclosure WO 98/55302 A.

The measured values MW determined by the mobile cell measuring instrument 1 are transmitted wirelessly by the integrated measured value transmitter 10, via a transmission channel 14, to a measured value receiver 15 and are forwarded there via a line 16 for further processing. The measured value receiver 15 is preferably installed in a fixed location and on or in the non-illustrated engraving machine. In order to avoid interference during the measured value transmission, in particular in the case of a plurality of engraving machines, it proves to be expedient to limit the measured value transmission to a calibration phase of the respective engraving machine.

The operating instrument 2, which is likewise mobile, substantially contains a function keyboard 17 that can be operated by an operator and a positioning lever 18 formed as a joy stick, and also a control command transmitter/receiver 19, a monitoring device 20, for example in the form of a monitor lamp, and an operating voltage source 21, which in turn is constructed as a battery or a rechargeable accumulator.

By the function keyboard 17 and the joy stick 18 of the mobile operating instrument 2, the operator can control the cell measuring instrument 1 remotely, by appropriate control commands SB being transmitted wirelessly by the control command transmitter/receiver 19 of the operating instrument 2, via a transmission channel 22, to the control command receiver 11 of the cell measuring instrument 1, and are forwarded to the positioning device 5, the image evaluation stage 8 and to the illumination source 7.

By the appropriate control commands SB, the operator can, for example, control the positioning and focusing of the video camera 4, in particular when the printing cylinders 3 of different diameters are used, the functions of the image evaluation stage 8, and the illumination source 7 with respect to optimum illumination of the sample cells 13 on the printing cylinder 3, with visual inspection by the control monitor 9 of the video image recorded.

Via the control command transmitter/receiver 19 and a further transmission channel 23, the operating instrument 2 receives an enable command from the engraving machine. The enable command signals to the operator, by the monitoring device 20, that the engraving machine is ready for a measuring operation.

The measured values and control commands are transmitted, for example, by infrared light, sound or by RF signals.

Instead of manual setting of the video camera 4 and/or of the illumination source 7 by the operator, the settings can advantageously also be controlled automatically by appropriate evaluation of the video image recorded by the video camera 4 in the image evaluation stage 8, by the position of a selected sample cell 13 being defined in the video image, position coordinates being determined from the position and the coordinates being provided to the positioning device 5 to correct the position of the video camera 4, the position correction ensuring that the selected sample cell 13 is located in the central area of the video image for the purpose of reliable evaluation.

The engraving machine advantageously has a suitable storage device, on which the cell measuring instrument 1 and the operating instrument 2 can be stored when they are not being used and which, at the same time, can be used as a charging station for the accumulators belonging to the instruments.

Such a mobile apparatus for measuring engraved sample cells following sample engraving can advantageously be used in the case of a large number of engraving machines, the cell measuring instrument 1 being transported as required from engraving machine to engraving machine, and each engraving machine being equipped with a corresponding measured value receiver. In order to avoid damage to the cell measuring instrument 1 placed on the printing cylinder 3 in the event that engraving is inadvertently started, it proves to be expedient to equip each engraving machine with a monitoring device, which monitors the presence of the cell measuring instrument 1 on the printing cylinder 3 and, if necessary, prevents engraving from being started.

Figure 2:
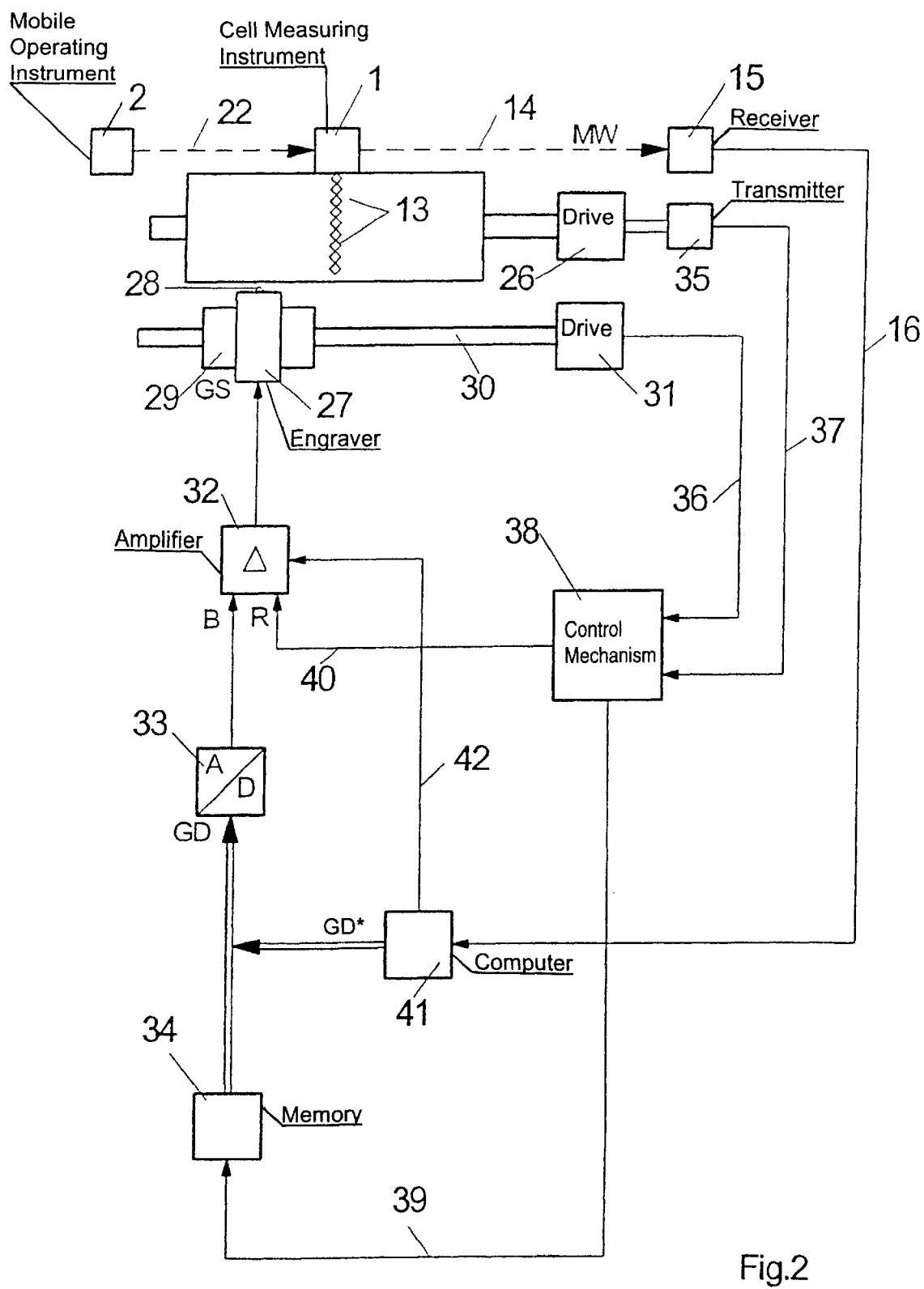
FIG. 2 is a block diagram of an engraving machine having the apparatus for measuring engraved sample cells.

FIG. 2 shows a block diagram of an engraving machine having the apparatus for measuring engraved sample cells. The engraving machine is, for example, a HelioKlischograph® from Hell Gravure Systems GmbH, Kiel, Germany.

The printing cylinder 3 is driven in rotation by a cylinder drive 26. The engraving on the printing cylinder 3 is carried out by an engraving element 27 that, for example, is configured as an electromagnetic engraving element having an engraving gouge 28 as a cutting tool. The engraving element 27 is located on an engraving carriage 29, which is moved axially passed the printing cylinder 3 by an engraving carriage drive 31 and a spindle 30.

The engraving gouge 28 of the engraving element 27 is controlled by an engraving control signal GS. The engraving control signal GS is formed in an engraving amplifier 32 by superimposing a periodic scanning signal R with image signal values B which represent the tonal values of the cells to be engraved between "light" and "depth". While the periodic scanning signal R has the effect of a vibrating reciprocating movement of the engraving gouge 28 to produce the engraving pattern, the image signal values B determine the penetration depth of the engraving gouge 28 into the printing cylinder 3 in accordance with the tonal values to be engraved.

The analog image signal values B are obtained in a D/A converter 33 from engraving data GD, which are stored in an engraving data memory 34 and are read out from the latter and fed to the D/A converter 33.

Associated with the printing cylinder 3 is an XY coordinate system, whose X axis is oriented in an axial direction and whose Y axis is oriented in a circumferential direction of the printing cylinder 3. The engraving carriage drive 31 generates the X-location coordinates, and a position transmitter 35 coupled mechanically to the cylinder drive 26 generates the Y location coordinates, which are fed to a control mechanism 38 via lines 36, 37.

The control mechanism 38 controls the addressing and the reading of the engraving data GD from the engraving data memory 34 as a function of the XY location coordinates of the current engraving locations, via a line 39. The control mechanism 38 in addition generates the scanning signal R on a line 40.

In order to carry out a sample or test cut before the actual engraving, the engraving machine has a sample engraving computer 41, which supplies the D/A converter 33 with the engraving data GD* which are required to engrave the sample cells 13 and which represent the predefined desired tonal value of the sample cells 13.

After the sample engraving, the mobile cell measuring instrument 1 is placed on the printing cylinder 3 and is controlled wirelessly by the operator, via the transmission channel 22, by the mobile operating instrument 2. Using the cell measuring instrument 2, the actual geometric dimensions of the engraved sample cells 13 are then measured and, as measured values MW, are transmitted wirelessly via the transmission channel 14 to the fixed-location measured value receiver 15, from which the measured values MW are forwarded via the line 16 to the sample engraving computer 41. In the sample engraving computer 41, by comparing the actual measured dimensions with predefined desired dimensions, setting values for calibrating the engraving amplifier 32 are obtained, and are fed to the latter via a line 42.

I claim:

1. A method for determining dimensions of an engraved cell formed by an electronic engraving machine for engraving printing cylinders for gravure printing, which comprises the steps of:

during a test engraving period, engraving test cells with desired dimensions defining predefined desired tonal values;

using an engraving element controlled by an engraving control signal for engraving a sequence of cells into a rotating printing cylinder resulting in engraved cells, actual dimensions of the engraved cells representing actual tonal values;

providing a measuring apparatus constructed as a mobile cell measuring instrument, and placing the mobile cell measuring instrument on the printing cylinder to be measured;

measuring the actual dimensions of the engraved cells using the mobile cell measuring instrument and comparing the actual dimensions with the desired dimensions determining the predefined desired tonal values, to obtain setting values for calibrating the engraving control signal such that the actual tonal values correspond to the desired tonal values; and transmitting the actual dimensions of the engraved cells determined with the mobile cell measuring instrument wirelessly to a measured value receiver for further processing.

2. The method according to claim 1, which comprises placing the measured value receiver in a fixed location.

3. The method according to claim 1, which comprises carrying out a transmission of the actual dimensions only during a calibration period of the engraving control signal.

4. The method according to claim 1, which comprises controlling functions of the mobile cell measuring instrument using a manually operated, mobile operating instrument.

5. The method according to claim 4, which comprises:

generating control commands in the mobile operating instrument; and transmitting the control commands for controlling the functions of the mobile cell measuring instrument wirelessly from the mobile operating instrument to the mobile cell measuring instrument.

6. The method according to claim 4, which comprises using the mobile operating instrument for controlling a positioning of the mobile cell measuring instrument with respect to the printing cylinder.

7. The method according to claim 1, which comprises using the mobile operating instrument for controlling a focusing of the mobile cell measuring instrument onto the printing cylinder.

8. The method according to claim 1, which comprises using the mobile operating instrument for controlling an illumination of the engraved cells.

9. The method according to claim 1, which comprises operating at least one of the mobile cell measuring instrument and the mobile operating instrument with a rechargeable operating voltage source.

10. An apparatus for determining dimensions of engraved cells formed by an engraving machine for engraving printing cylinders for gravure printing, comprising:

a measured value receiver; and a mobile cell measuring instrument to be placed on a printing cylinder to be measured to determine the dimensions of the engraved cells, said mobile cell measuring instrument having an integrated measured value transmitter for transmitting the dimensions of the engraved cells wirelessly to said measured value receiver for further processing.

11. The apparatus according to claim 10, wherein said mobile cell measuring instrument includes:

a video camera to record a video image of the engraved cells;

an illumination source for illuminating the engraved cells; and an image evaluation stage connected to said video camera for determining the dimensions of the engraved cells by electronic evaluation of the video image provided by said video camera, said image evaluation stage also connected to said measured value transmitter for the wireless transmission of the dimensions of the engraved cells, said measured valued receiver being a fixed-location measured value receiver.

12. The apparatus according to claim 10, wherein said mobile cell measuring instrument has a rechargeable operating voltage source.

13. The apparatus according to claim 11, wherein said illumination source can be controlled in order to correct an illumination of the engraved cells.

14. The apparatus according to claim 13, wherein said mobile cell measuring instrument has a controllable positioning device that is operatively connected to said video camera for at least one of positioning and focusing said video camera.

15. The apparatus according to claim 14, wherein said mobile cell measuring instrument has a control stage connected between said positioning device and said illumination source to control at least one of said positioning device and said illumination source as a function of control commands received.

16. The apparatus according to claim 15, wherein said mobile cell measuring instrument has a control command receiver connected to said control stage and receives the control commands wirelessly.

17. The apparatus according to claim 16, wherein said mobile cell measuring instrument has a control monitor for monitoring a measuring operation and is connected to said video camera.

18. The apparatus according to claim 15, including a manually operated, mobile operating instrument for generating the control commands, said mobile operating instrument having a control command transmitter for transmitting wirelessly the control commands to said mobile cell measuring instrument.

19. The apparatus according to claim 18, wherein said mobile cell operating instrument has a manually operated keyboard connected to said control command transmitter and a manually operated positioning device connected to said control command transmitter, the control commands able to be generated in said mobile operating instrument by use of said manually operated keyboard and by said manually operated positioning device.

20. The apparatus according to claim 18, wherein said mobile operating instrument has a rechargeable operating voltage source.

21. The apparatus according to claim 18, wherein said mobile operating instrument able to be activated by an enable command received from the engraving machine.

22. An engraving machine for engraving printing cylinders for gravure printing, comprising:
a first drive for driving and mounting a printing cylinder so as to be capable of rotating the printing cylinder;
an engraving element, acted on by an engraving control signal, for engraving cells into the printing cylinder;
a second drive coupled to said engraving element for moving said engraving element along the printing cylinder;
a signal conditioning stage for generating the engraving control signal and connected to said engraving element;
a sample engraving computer connected to said signal conditioning stage, said sample engraving computer formulating engraving control signal values for engraving the cells;
a measuring apparatus measuring actual dimensions of the cells representing actual tonal values to be compared with desired dimensions representing predefined desired tonal values in order to obtain setting values for calibrating the engraving control signal, said measuring apparatus being a mobile cell measuring instrument disposed on the printing cylinder to be measured and having an integrated measured value transmitter; and a fixed-location measured value receiver connected to said sample engraving computer, the actual dimensions of the cells engraved determined by said mobile cell measuring instrument being transmitted wirelessly by said integrated measured value transmitter to said fixed-location measured value receiver for further processing.

23. The engraving machine according to claim 22, wherein said mobile cell measuring instrument includes:
a video camera to record a video image of the cells;
a positioning device operatively connected to said video camera and receiving control commands for at least one of positioning and focusing said video camera;
an illumination source, receiving and controlled by the control commands, for illuminating the cells;
an image evaluation stage connected to said video camera for determining the actual dimensions of the cells by an electronic evaluation of the video image provided by said video camera;
a rechargeable operating voltage source; and a measured value transmitter connected to said image evaluation stage, said measured value transmitter providing a wireless transmission of the actual dimensions of the cells to said fixed-location measured value receiver.

24. The engraving machine according to claim 23, including a manually operated, mobile operating instrument for generating the control commands, said mobile operating instrument having a control command transmitter for transmitting wirelessly the control commands from said mobile operating instrument to said mobile cell measuring instrument.

* * * * *